United States Patent
Sudo (10) Patent No.: US 11,509,856 B2
(45) Date of Patent: Nov. 22, 2022

(54) IMAGE PROCESSING APPARATUS, IMAGE CAPTURING APPARATUS, IMAGE PROCESSING METHOD, CONTROL METHOD, AND STORAGE MEDIUM

(71) Applicant: CANON KABUSHIKI KAISHA, Tokyo (JP)

(72) Inventor: Takayuki Sudo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 16/775,466

(22) Filed: Jan. 29, 2020

(65) Prior Publication Data
US 2020/0267347 A1 Aug. 20, 2020

(30) Foreign Application Priority Data
Feb. 15, 2019 (JP) .............................. JP2019-025787

(51) Int. Cl.
| | |
|---|---|
| H04N 9/80 | (2006.01) |
| H04N 5/92 | (2006.01) |
| G06T 5/00 | (2006.01) |
| H04N 5/217 | (2011.01) |
| G06T 5/20 | (2006.01) |

(52) U.S. Cl.
CPC .............. *H04N 5/92* (2013.01); *G06T 5/002* (2013.01); *G06T 5/20* (2013.01); *H04N 5/217* (2013.01); *G06T 2207/10016* (2013.01)

(58) Field of Classification Search
USPC ........................................................ 386/248
See application file for complete search history.

(56) References Cited

U.S. PATENT DOCUMENTS

| | | | |
|---|---|---|---|
| 6,285,368 B1 | 9/2001 | Sudo | |
| 10,469,749 B1* | 11/2019 | Linzer | ........................ G06T 5/00 |
| 2003/0156301 A1* | 8/2003 | Kempf | ................. H04N 7/0137 |
| | | | 348/E5.142 |
| 2005/0280739 A1* | 12/2005 | Lin | ........................... G06T 5/50 |
| | | | 348/E5.065 |
| 2010/0182510 A1* | 7/2010 | Gerkmann | ........... G10L 21/0208 |
| | | | 704/203 |
| 2018/0098004 A1* | 4/2018 | Korneliussen | .......... H04N 5/357 |
| 2018/0315172 A1* | 11/2018 | Smirnov | ................ G06T 7/0002 |
| 2019/0142253 A1* | 5/2019 | Takahashi | .................. G06T 7/20 |
| | | | 600/109 |
| 2019/0355098 A1* | 11/2019 | Ferrés | ...................... G06T 5/002 |
| 2019/0362507 A1* | 11/2019 | Papari | ........................ G06T 7/20 |
| 2020/0051209 A1* | 2/2020 | Smirnov | .................... G06T 3/40 |
| 2020/0267339 A1* | 8/2020 | Douady-Pleven | ... H04N 5/3572 |

FOREIGN PATENT DOCUMENTS

JP 2010-258996 A 11/2010

\* cited by examiner

*Primary Examiner* — Nigar Chowdhury
(74) *Attorney, Agent, or Firm* — Venable LLP (57) ABSTRACT

There is provided an image processing apparatus. An obtaining unit obtains an image, and first NR information defining noise reduction processing using a first noise reduction processing method which an external apparatus can apply to the image. A generating unit generates, on the basis of the first NR information, second NR information defining noise reduction processing using a second noise reduction processing method which is different from the first noise reduction processing method. A noise reducing unit applies the noise reduction processing using the second noise reduction processing method to the image in accordance with the second NR information.

7 Claims, 7 Drawing Sheets

FIG. 9

IMAGE PROCESSING APPARATUS, IMAGE CAPTURING APPARATUS, IMAGE PROCESSING METHOD, CONTROL METHOD, AND STORAGE MEDIUM

BACKGROUND OF THE INVENTION

Field of the Invention

The present invention relates to an image processing apparatus, an image capturing apparatus, an image processing method, a control method, and a storage medium.

Description of the Related Art

Image capturing apparatuses such as video cameras can carry out a developing process on raw image data (RAW images) captured by an image sensor during shooting. Specifically, the image capturing apparatus carries out a debayering process (demosaicing) on the RAW image and converts the RAW image into signals corresponding to luminance and color difference components. The image capturing apparatus also carries out processes such as noise reduction, optical distortion correction, and image optimization on each signal. The image capturing apparatus then compresses/encodes the luminance signal and color difference signals, and records these in a recording medium.

With respect to noise reduction processing, Japanese Patent Laid-Open No. 2010-258996 proposes obtaining a frame image, analyzing a bright/dark histogram distribution of the frame image, and carrying out noise reduction processing on the basis of bright/dark distribution information.

There are also image capturing apparatuses which can record moving image data in the RAW format ("RAW moving images" hereinafter). Although a RAW moving image involves recording a much greater amount of data, a RAW moving image is advantageous in that it keeps distortion, degradation, and the like to a minimum compared to the original image and can furthermore be edited after shooting, and is therefore widely used in the cinema industry and the like. With image capturing apparatuses that record RAW moving images, a technique is known in which developing parameters are recorded in association with each frame along with the RAW moving image, and during playback, the RAW moving image is developed/played back using the developing parameters. Developing parameters used when generating a monitoring video for the purpose of checking the angle of view and the like, developing parameters for proxy recording videos recorded at the same time as the RAW moving image, and so on are used as the developing parameters which are recorded when shooting a RAW moving image. Parameters for various types of image processing, such as noise reduction processing, edge enhancement, and white balance, may also be recorded. The recorded RAW moving image is loaded into a PC, for example, and subjected to developing processes using various types of developing applications.

There has been a problem in that if the noise reduction processing method used by the developing application is different from the noise reduction processing method used by the image capturing apparatus, the parameters for the noise reduction processing which have been recorded (noise reduction processing information) cannot be used when playing back the image. For example, there are cases where the noise reduction processing method used by the image capturing apparatus is a frame reference-based, so-called "time direction" noise reduction processing method, whereas the noise reduction processing method used by the developing application is a so-called "spatial filter-based" noise reduction processing method. In such a case, the parameters for noise reduction processing which have been recorded cannot be used when playing back images.

SUMMARY OF THE INVENTION

Having been achieved in light of such circumstances, the present invention provides a technique that makes it possible to use noise reduction processing information, which defines noise reduction processing using a specific noise reduction processing method, when carrying out noise reduction processing using a different noise reduction processing method.

According to a first aspect of the present invention, there is provided an image processing apparatus comprising at least one processor and/or at least one circuit which functions as: an obtaining unit configured to obtain an image, and first NR information defining noise reduction processing using a first noise reduction processing method which an external apparatus can apply to the image; a generating unit configured to generate, on the basis of the first NR information, second NR information defining noise reduction processing using a second noise reduction processing method which is different from the first noise reduction processing method; and a noise reducing unit configured to apply the noise reduction processing using the second noise reduction processing method to the image in accordance with the second NR information.

According to a second aspect of the present invention, there is provided an image capturing apparatus comprising: an image sensor configured to capture an image; and at least one processor and/or at least one circuit which functions as: a first generating unit configured to generate first NR information defining noise reduction processing using a first noise reduction processing method; a second generating unit configured to generate, on the basis of the first NR information, second NR information defining noise reduction processing using a second noise reduction processing method which is different from the first noise reduction processing method and which an external apparatus can apply to the image; a noise reducing unit configured to apply the noise reduction processing using the first noise reduction processing method to the image in accordance with the first NR information; and a recording unit configured to record the second NR information, and the image to which the noise reduction processing has not yet been applied by the noise reducing unit, in association with each other.

According to a third aspect of the present invention, there is provided an image processing method executed by an image processing apparatus, comprising: obtaining an image, and first NR information defining noise reduction processing using a first noise reduction processing method which an external apparatus can apply to the image; generating, on the basis of the first NR information, second NR information defining noise reduction processing using a second noise reduction processing method which is different from the first noise reduction processing method; and applying the noise reduction processing using the second noise reduction processing method to the image in accordance with the second NR information.

According to a fourth aspect of the present invention, there is provided a control method executed by an image capturing apparatus comprising: capturing an image; generating first NR information defining noise reduction processing using a first noise reduction processing method; generating, on the basis of the first NR information, second NR information defining noise reduction processing using a second noise reduction processing method which is different from the first noise reduction processing method and which an external apparatus can apply to the image; applying the noise reduction processing using the first noise reduction processing method to the image in accordance with the first NR information; and recording the second NR information, and the image to which the noise reduction processing has not yet been applied by the noise reducing unit, in association with each other.

According to a fifth aspect of the present invention, there is provided a non-transitory computer-readable storage medium which stores a program for causing a computer to execute an image processing method comprising: obtaining an image, and first NR information defining noise reduction processing using a first noise reduction processing method which an external apparatus can apply to the image; generating, on the basis of the first NR information, second NR information defining noise reduction processing using a second noise reduction processing method which is different from the first noise reduction processing method; and applying the noise reduction processing using the second noise reduction processing method to the image in accordance with the second NR information.

According to a sixth aspect of the present invention, there is provided a non-transitory computer-readable storage medium which stores a program for causing a computer to execute a control method comprising: capturing an image; generating first NR information defining noise reduction processing using a first noise reduction processing method; generating, on the basis of the first NR information, second NR information defining noise reduction processing using a second noise reduction processing method which is different from the first noise reduction processing method and which an external apparatus can apply to the image; applying the noise reduction processing using the first noise reduction processing method to the image in accordance with the first NR information; and recording the second NR information, and the image to which the noise reduction processing has not yet been applied by the noise reducing unit, in association with each other.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1:
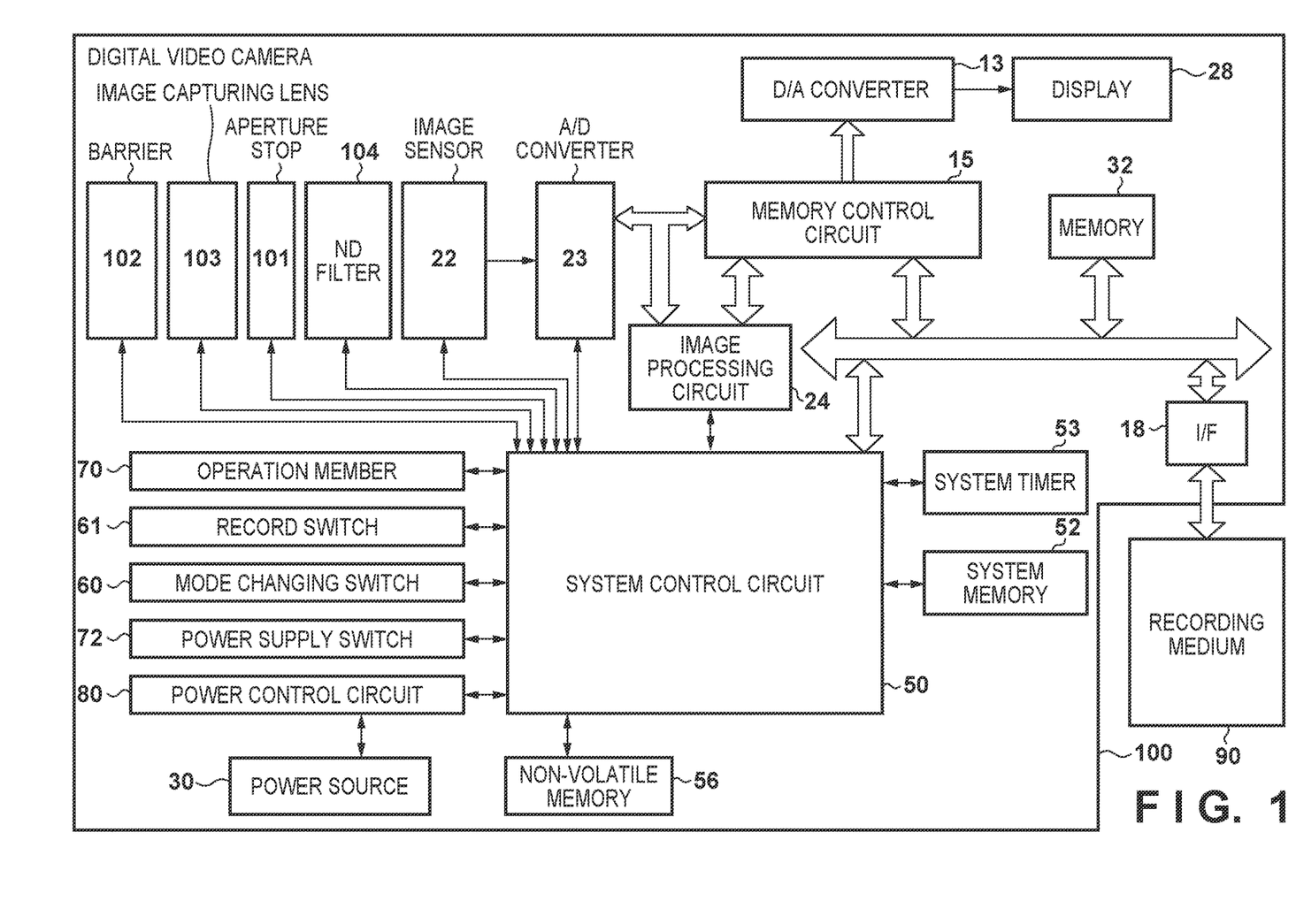
FIG. 1 is a block diagram illustrating the internal configuration of a digital video camera 100.

FIG. 1 is a block diagram illustrating the internal configuration of a digital video camera 100 serving as an example of an image capturing apparatus. In FIG. 1, an image capturing lens 103 is a lens group including a zoom lens and a focus lens, which forms a subject image. An aperture stop 101 is an aperture stop used to adjust the light amount. An ND filter 104 is a filter used for light reduction. An image sensor 22 is constituted by a CCD, a CMOS element, or the like that converts an optical image into an electrical signal. Additionally, the image sensor 22 has functions for controlling charge accumulation using an electronic shutter, changing the analog gain and readout speed, and so on. An A/D converter 23 converts analog signals into digital signals. The A/D converter 23 is used to convert analog signals output from the image sensor 22 into digital signals. A barrier 102 prevents an image capturing system of the digital video camera 100 including the image capturing lens 103, the aperture stop 101, and the image sensor 22 from being soiled or damaged by covering the image capturing system including the image capturing lens 103.

The present embodiment will describe an example in which the digital video camera 100 records a RAW moving image. An image processing circuit 24 carries out processing such as color conversion processing, gamma correction, noise reduction processing, adding digital gain, and the like on data from the A/D converter 23 or data from a memory control circuit 15, in order to generate a monitoring video. However, the image processing circuit 24 does not process a RAW moving image which is a recorded video. The image processing circuit 24 also carries out predetermined computational processes using captured image data, and sends the computation results to a system control circuit 50. On the basis of the computation results which have been sent, the system control circuit 50 carries out exposure control, rangefinding control, white balance control, and the like. Through-the-lens (TTL) autofocus (AF) processing, automatic exposure (AE) processing, auto white balance (AWB) processing, and so on are carried out as a result. The image processing circuit 24 will be described in detail later.

Data output from the A/D converter 23 is written directly into memory 32 through the image processing circuit 24 and the memory control circuit 15, or through the memory control circuit 15. The memory 32 stores the image data captured by the image sensor 22 and converted into digital data by the A/D converter 23, image data for display in a display 28, and the like. The memory 32 is provided with a storage capacity sufficient to store a predetermined time's worth of moving images and audio. The memory 32 also functions as image display memory (video memory).

A D/A converter 13 converts image display data, stored in the memory 32, into an analog signal and supplies the analog signal to the display 28. The image data for display written into the memory 32 is displayed by the display 28 via the D/A converter 13 in this manner. The display 28 carries out a display in a display device such as an LCD or the like based on the analog signal from the D/A converter 13. The digital signals A/D-converted by the A/D converter 23 and accumulated in the memory 32 are converted to analog signals by the D/A converter 13 and are then sequentially transferred to and displayed by the display 28; as a result, the display 28 can function as an electronic viewfinder, and a through-the-lens image can be displayed.

Non-volatile memory 56 is electrically erasable/recordable memory, e.g., EEPROM. Operational constants, programs, and so on of the system control circuit 50 are stored in the non-volatile memory 56. "Programs" refers to programs through which the system control circuit 50 executes various types of processes.

The system control circuit 50 controls the digital video camera 100 as a whole. The system control circuit 50 implements the various types of processes by executing programs recorded in the non-volatile memory 56 mentioned above. System memory 52 is RAM, for example. Operational constants and variables of the system control circuit 50, programs read out from the non-volatile memory 56, and so on are loaded into the system memory 52. The system control circuit 50 also carries out display control by controlling the memory 32, the D/A converter 13, the display 28, and so on.

A system timer 53 measures times used in various types of control, measures the time of an internal clock, and so on. A mode changing switch 60, a record switch 61, and an operation member 70 are operation means for inputting various types of operational instructions to the system control circuit 50.

The mode changing switch 60 switches an operating mode of the system control circuit 50 among a moving image recording mode, a still image recording mode, a playback mode, and so on. The moving image recording mode and still image recording mode include an auto shooting mode, an auto scene judgment mode, a manual mode, various types of scene modes having shooting settings for each type of shot scene, a program AE mode, a custom mode, and so on. The mode changing switch 60 can switch the operating mode directly to one of these modes included in the moving image recording mode. Alternatively, the mode switch may be carried out by first switching to the moving image recording mode using the mode changing switch 60 and then using other operating means to switch to one of the modes included in the moving image recording mode. The record switch 61 switches between a shooting standby state and a shooting state. The system control circuit 50 starts a sequence of operations, from reading out signals from the image sensor 22 to writing moving image data into a recording medium 90, in response to the record switch 61 being operated.

Functions relevant for different situations are assigned to the operation member 70, which then act as various types of function buttons, by making an operation for selecting various types of function icons displayed in the display 28. An end button, a return button, a next image button, a jump button, a sort button, an attribute change button, and so on are examples of the function buttons. For example, a menu screen in which various types of settings can be made is displayed in the display 28 when a menu button is pressed. A user can make various types of settings intuitively using the menu screen displayed in the display 28, along with four directional (up, down, left, and right) cross key, a set button, and so on.

A power control circuit 80 is constituted by a battery detection circuit, a DC-DC converter, switch circuits for switching the blocks through which power passes, and so on, and detects whether or not a battery is connected, the type of the battery, the remaining battery power, and so on. The power control circuit 80 also controls the DC-DC converter on the basis of the detection results and instructions from the system control circuit 50, and supplies a necessary voltage for a necessary period to the various units, including the recording medium 90. A power source 30 is a primary battery such as an alkaline battery, a lithium battery, or the like, a secondary battery such as a NiCd battery, a NiMH battery, a Li ion battery, or the like, an AC adapter, and so on. An I/F 18 is an interface for the recording medium 90, which is a memory card, a hard disk, or the like, or for an external output device. FIG. 1 illustrates a state in which the recording medium 90 is connected. The recording medium 90 is a recording medium for recording shot RAW moving images, such as a memory card or the like, and is constituted by semiconductor memory, a magnetic disk, or the like.

Figure 3:
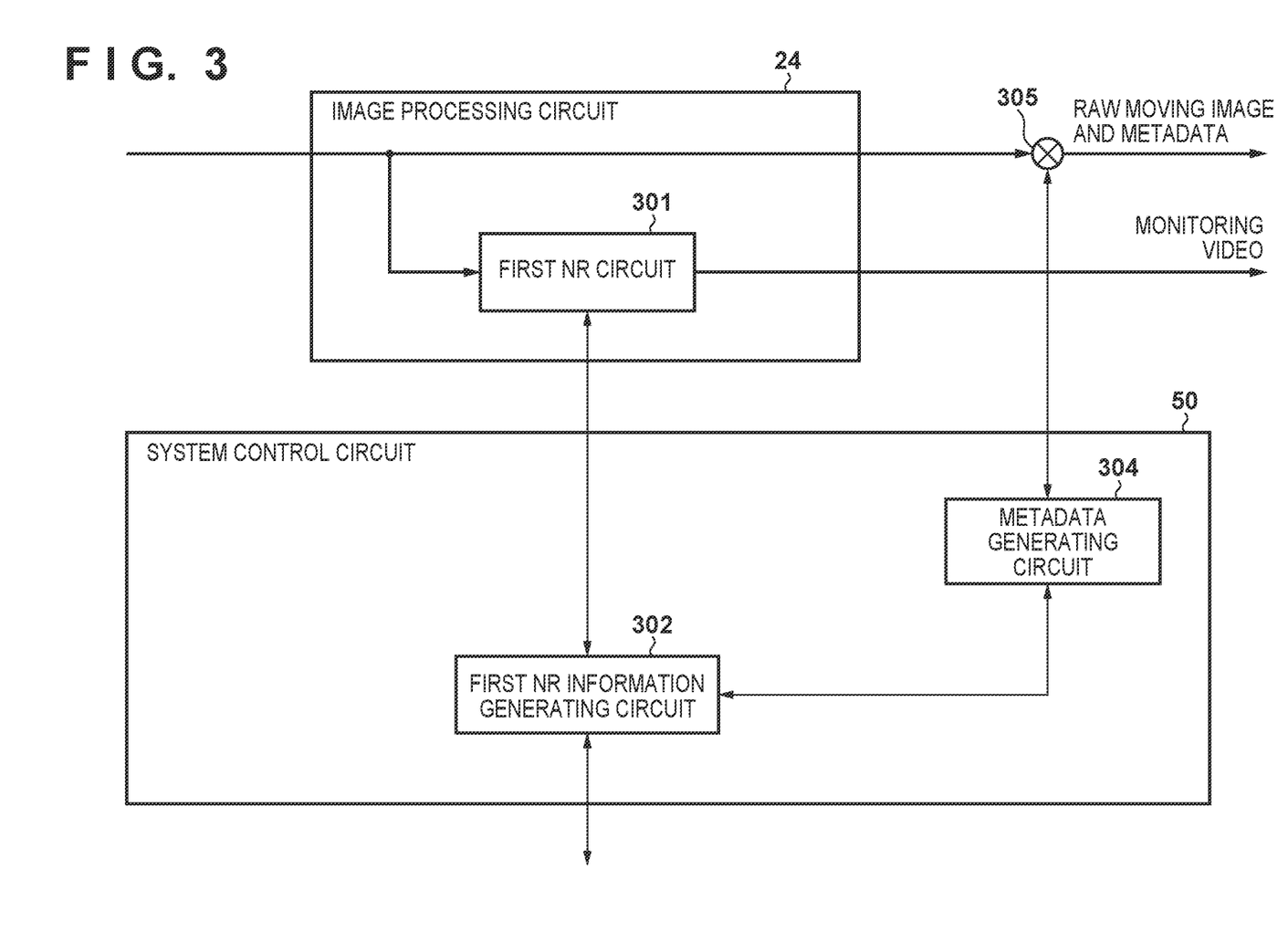
FIG. 3 is a diagram illustrating, in detail, the configuration of an image processing circuit 24 and a system control circuit 50, according to a first embodiment.

Next, the processing performed by the image processing circuit 24 and the system control circuit 50 will be described in detail with reference to FIG. 3. Note that the image processing circuit 24 is capable of obtaining various types of information from within the digital video camera 100, including exposure parameters such as the f-stop value, ND information, and shutter speed, through the system control circuit 50.

A first NR circuit 301 carries out recursive noise reduction processing, which is noise reduction processing in the time direction, on the monitoring video.

A first NR information generating circuit 302 generates parameters (first NR information), such as a recursive coefficient, which define the noise reduction processing executed by the first NR circuit 301, and sets the generated parameters in the first NR circuit 301. The strength of the recursive noise reduction processing is generally known to be expressed by the recursive coefficient. The recursive coefficient is a numerical value indicating the degree to which the effect of differences between frames is to be eliminated, with higher numerical values indicating higher noise reduction effects (i.e., higher noise reduction strengths). For example, the first NR information generating circuit 302 holds a plurality of parameters corresponding to strengths of the noise reduction processing in advance, and then generates the first NR information in accordance with differences in the signal level between frames or a strength setting made through the operation member 70.

A metadata generating circuit 304 generates metadata to be added to the RAW moving image. The metadata includes the first NR information and various types of developing parameters. When generating the metadata, the metadata generating circuit 304 adds information indicating the type of the noise reduction processing executed by the first NR circuit 301 to the first NR information. An adder 305 adds the metadata generated by the metadata generating circuit 304 to the RAW moving image input to the image processing circuit 24.

Note that the type of the noise reduction processing executed by the first NR circuit 301 (the noise reduction processing method) is not limited to recursive noise reduction processing (a recursive-type noise reduction processing method). The specific content of the first NR information changes depending on the type of the noise reduction processing executed by the first NR circuit 301, but includes information that can specify the content of the noise reduction processing, e.g., the type, processing order, various setting values, and so on.

Figure 4:
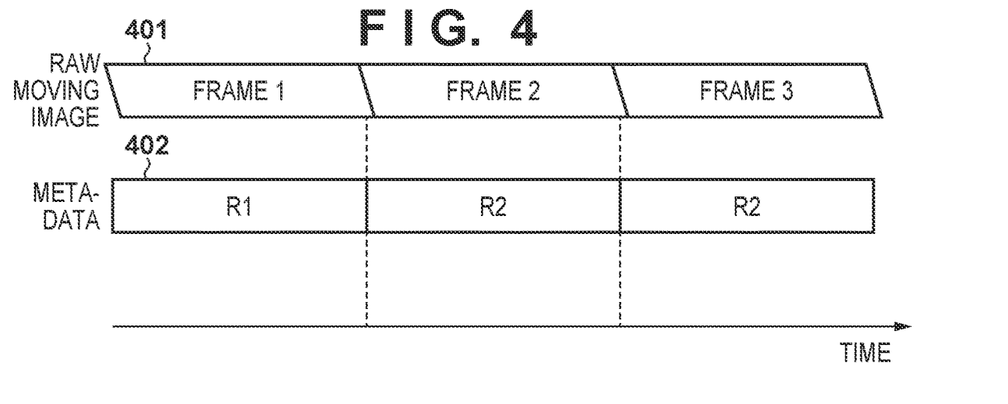
FIG. 4 is a conceptual diagram illustrating a RAW moving image to which metadata has been added, according to the first embodiment.

FIG. 4 is a conceptual diagram of a RAW moving image to which the metadata has been added. A RAW moving image 401 is constituted by three frames' worth of images (frames 1 to 3). Metadata 402 includes parameters for the noise reduction processing to be applied, on a frame-by-frame basis. In the following descriptions, R1 represents a recursive coefficient 2, and R2 represents a recursive coefficient 4. As described earlier, the strength of the noise reduction processing is set on the basis of the difference in signal levels between frames or through the operation member 70, and parameters based on the set strength are recorded for each frame.

Figure 2:
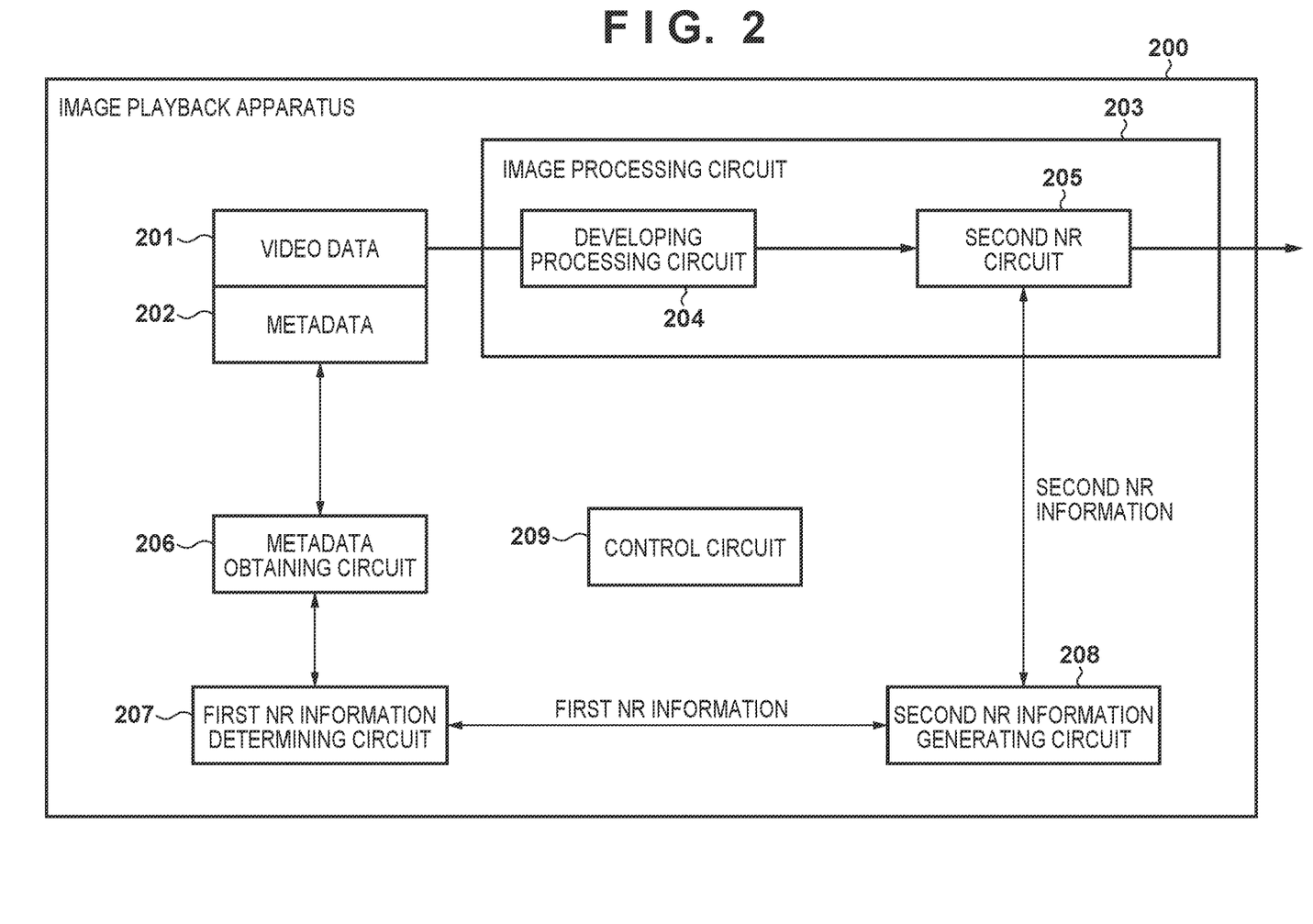
FIG. 2 is a block diagram illustrating the internal configuration of an image playback apparatus 200.

Next, an image playback apparatus 200, serving as an example of an image processing apparatus, will be described with reference to FIG. 2. FIG. 2 is a block diagram illustrating the internal configuration of the image playback apparatus 200. Video data 201 includes the RAW moving image to be played back. The image playback apparatus 200 can obtain the video data 201, which includes a RAW moving image shot by the digital video camera 100, from the aforementioned recording medium 90 (FIG. 1), for example. Metadata 202 is the metadata generated by the aforementioned metadata generating circuit 304 (FIG. 2).

An image processing circuit 203 includes a developing processing circuit 204 and a second NR circuit 205, and carries out various types of image quality processing on the RAW moving image, including noise reduction processing. Although white balance control, sharpness control, and the like are also typically carried out by the image processing circuit 203, such control is not necessary for the descriptions of the present embodiment, and thus configurations for white balance control, sharpness control, and the like are not illustrated in the drawings. The developing processing circuit 204 carries out a developing process on the RAW moving image. For example, the developing processing circuit 204 carries out a debayering process on the RAW moving image, converting the RAW moving image into a predetermined video signal format such as the so-called YUV format, constituted by luminance and color difference signals. The second NR circuit 205 carries out epsilon filter processing, which is spatial filter-based noise reduction processing, on the developed video. The strength of the epsilon filter typically increases the weighting ratio of the surrounding pixel regions and surrounding pixels on a pixel of interest. However, to simplify the descriptions, the present embodiment will describe a configuration in which the noise reduction effect is strengthened by broadening a reference pixel range to 3×3 pixels, 5×5 pixels, and so on, as an example.

Note that the type of the noise reduction processing executed by the second NR circuit 205 (the noise reduction processing method) is not limited to an epsilon filter process. There are a variety of types of noise reduction processing, such as median filter processing, Gaussian filter processing, and so on, but any types may be used as long as the first NR circuit 301 and the second NR circuit 205 carry out different types of noise reduction processing, and thus the present embodiment is not limited to a specific type. For example, the second NR circuit 205 uses one of a recursive noise reduction processing method and a spatial filter-type noise reduction processing method, and the first NR circuit 301 uses the other of the recursive noise reduction processing method and the spatial filter-type noise reduction processing method.

Additionally, although the present embodiment describes a case where the image to be played back is a RAW moving image as an example, the image to be played back is not limited to a RAW moving image. For example, the image to be played back may be a moving image that has already been developed. In this case, the developing processing circuit 204 does not carry out the developing process. Furthermore, the image to be played back may be a RAW still image, or a still image that has already been developed. The technique of the present embodiment can be applied to any situation in which it is necessary to change the type, strength settings, and so on of noise reduction processing between when an image is shot and when the image is played back.

A metadata obtaining circuit 206 obtains the metadata 202 associated with each frame of the video data 201. A first NR information determining circuit 207 determines information pertaining to the noise reduction processing that was carried out by the digital video camera 100 when shooting the RAW moving image (the first NR information) on the basis of the metadata 202. Note that the RAW moving image to be played back has not yet been subjected to noise reduction processing. The "noise reduction processing carried out by the digital video camera 100 when shooting the RAW moving image" refers to the noise reduction processing carried out to generate the monitoring video when shooting the RAW moving image.

A second NR information generating circuit 208 generates noise reduction processing information for spatial filter-type noise reduction processing which can be used by the second NR circuit 205 (the second NR information) on the basis of the first NR information.

A control circuit 209 includes ROM and RAM (not shown), and controls the various units in the image playback apparatus 200 by using the RAM as work memory to execute programs stored in the ROM.

An NR information setting process executed by the image playback apparatus 200 will be described next with reference to FIG. 5. The image playback apparatus 200 executes the processing illustrated in this flowchart on a frame-by-frame basis upon the video data 201 and the metadata 202 being input to the image playback apparatus 200.

In step S501, the metadata obtaining circuit 206 obtains the metadata 202 and outputs that metadata 202 to the first NR information determining circuit 207.

In step S502, the first NR information determining circuit 207 determines whether or not the first NR information can be obtained from the metadata 202. If the metadata 202 contains the first NR information, the first NR information determining circuit 207 determines that the first NR information can be obtained from the metadata 202. Note that even if the metadata 202 does not contain the first NR information, there are situations where the first NR information can be derived from some kind of information contained in the metadata 202. The first NR information determining circuit 207 determines that the first NR information can be obtained from the metadata 202 in such situations as well. The information which enables the first NR information to be derived is, for example, camera settings such as ISO sensitivity, subject luminance information, and the like, for example. For example, the first NR information determining circuit 207 holds table data in which details such as camera settings, luminance information, and the like are associated with details of the noise reduction processing, and derives the first NR information from the camera settings, luminance information, and the like by referring to the table data. If it is determined that the first NR information can be obtained from the metadata 202, the process moves to step S504, and if not, the process moves to step S503.

In step S503, the first NR information determining circuit 207 sets the noise reduction processing of the second NR circuit 205 to "off" via the second NR information generating circuit 208.

In step S504, the first NR information determining circuit 207 outputs the first NR information to the second NR information generating circuit 208, and the second NR information generating circuit 208 determines whether or not it is necessary to convert the first NR information. The second NR information generating circuit 208 determines that it is necessary to convert the first NR information if the type of the noise reduction processing corresponding to the first NR information is different from the type of the noise reduction processing executed by the second NR circuit 205. On the other hand, the second NR information generating circuit 208 determines that it is not necessary to convert the first NR information if the type of the noise reduction processing corresponding to the first NR information is the same as the type of the noise reduction processing executed by the second NR circuit 205. If it is not necessary to convert the first NR information, the process moves to step S505, whereas if it is necessary to convert the first NR information, the process moves to step S506.

In step S505, the first NR information determining circuit 207 sets the first NR information in the second NR circuit 205. As a result, the second NR circuit 205 executes the same noise reduction processing as that which the digital video camera 100 carried out on the monitoring video when shooting the RAW moving image.

In step S506, the second NR information generating circuit 208 generates the noise reduction processing information for the noise reduction processing executed by the second NR circuit 205 (the second NR information) on the basis of the first NR information. As mentioned earlier, the present embodiment describes a case where the first NR circuit 301 executes recursive noise reduction processing and the second NR circuit 205 executes epsilon filter processing as an example. The second NR information generating circuit 208 generates the second NR information by converting setting values for the recursive noise reduction processing into setting values for the epsilon filter processing. For converting the setting values, the second NR information generating circuit 208 holds, in advance, table data defining associations between setting values which produce similar noise reduction effects and which have a permissible level of negative effects, for example. Generally speaking, afterimages in the moving images are a negative effect of recursive noise reduction processing, whereas a drop in resolution is a negative effect of spatial filter-type noise reduction processing. Accordingly, the table data to be prepared is determined by confirming the video in advance, for example. For example, it is assumed that the second NR information generating circuit 208 holds table data such as R1 (weak; recursive coefficient 2)→P1 (weak: 3×3 pixels), and R2 (strong: recursive coefficient 4)→P2 (strong: 5×5 pixels).

In step S507, the second NR information generating circuit 208 sets the generated second NR information in the second NR circuit 205. Through this, a noise reduction effect similar to the effect of the noise reduction processing which has been carried out by the digital video camera 100 on the monitoring video when shooting the RAW moving image is also achieved in the moving image played back by the image playback apparatus 200.

Here, a configuration has been described in which the second NR information is generated so that the effect of the noise reduction processing executed by the second NR circuit 205 according to the second NR information becomes similar to the effect of the noise reduction processing executed by the first NR circuit 301 according to the first NR information. However, in the present embodiment, it is not absolutely necessary for the effect of the noise reduction processing executed by the second NR circuit 205 according to the second NR information to become similar to the effect of the noise reduction processing executed by the first NR circuit 301 according to the first NR information. Regardless of the format, an effect in which the first NR information can be utilized in the execution of the noise reduction processing by the second NR circuit 205 is achieved as long as the second NR information is generated on the basis of the first NR information.

Additionally, the descriptions of the present embodiment assume that the first NR circuit 301 actually carries out the noise reduction processing in accordance with the first NR information. However, it is not absolutely necessary for the first NR circuit 301 to carry out the noise reduction processing in accordance with the first NR information. The effects of the present embodiment can be achieved as long as the image playback apparatus 200 is configured so that the second NR information is generated on the basis of the first NR information, which defines noise reduction processing carried out through a specific noise reduction processing method applicable to an external apparatus such as the digital video camera 100.

Figure 5:
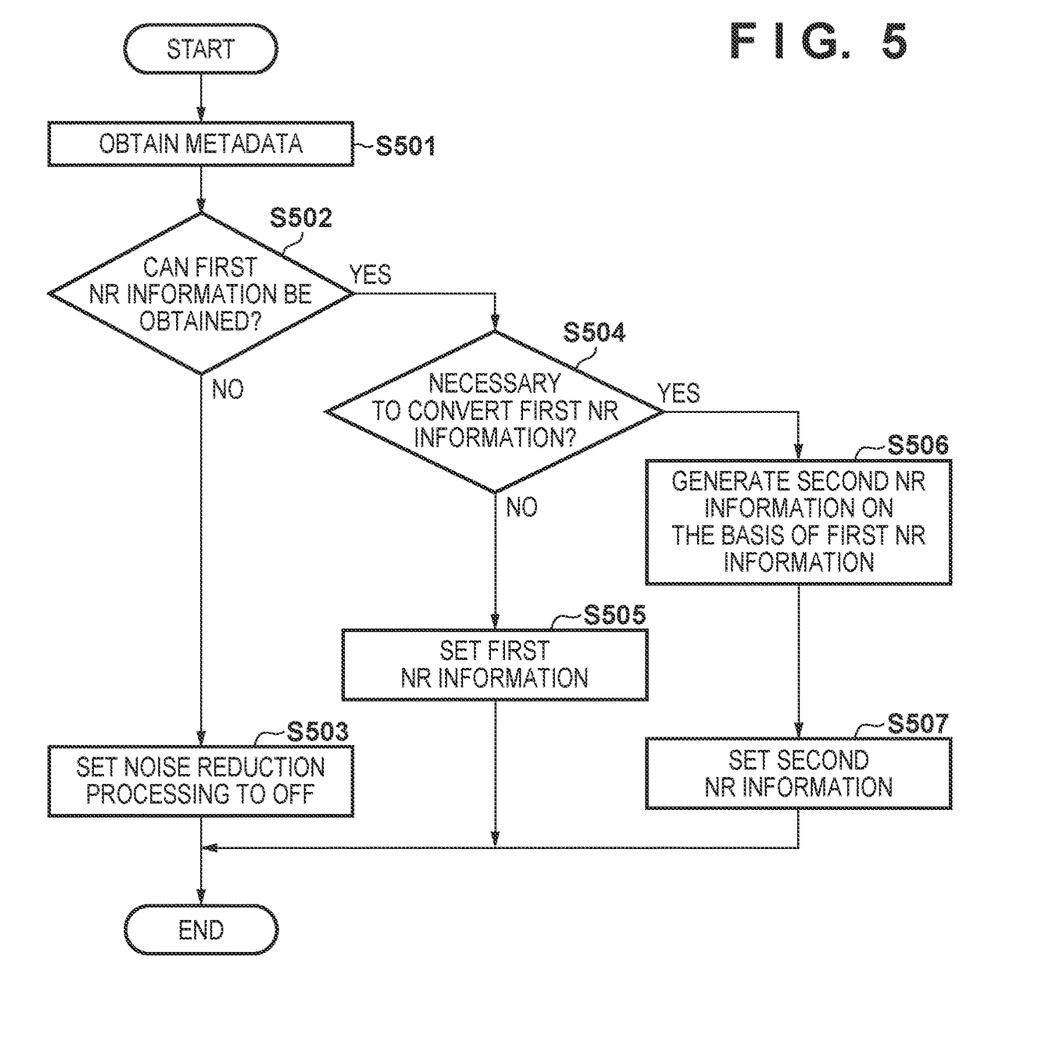
FIG. 5 is a flowchart illustrating an NR information setting process executed by the image playback apparatus 200.
Figure 6:
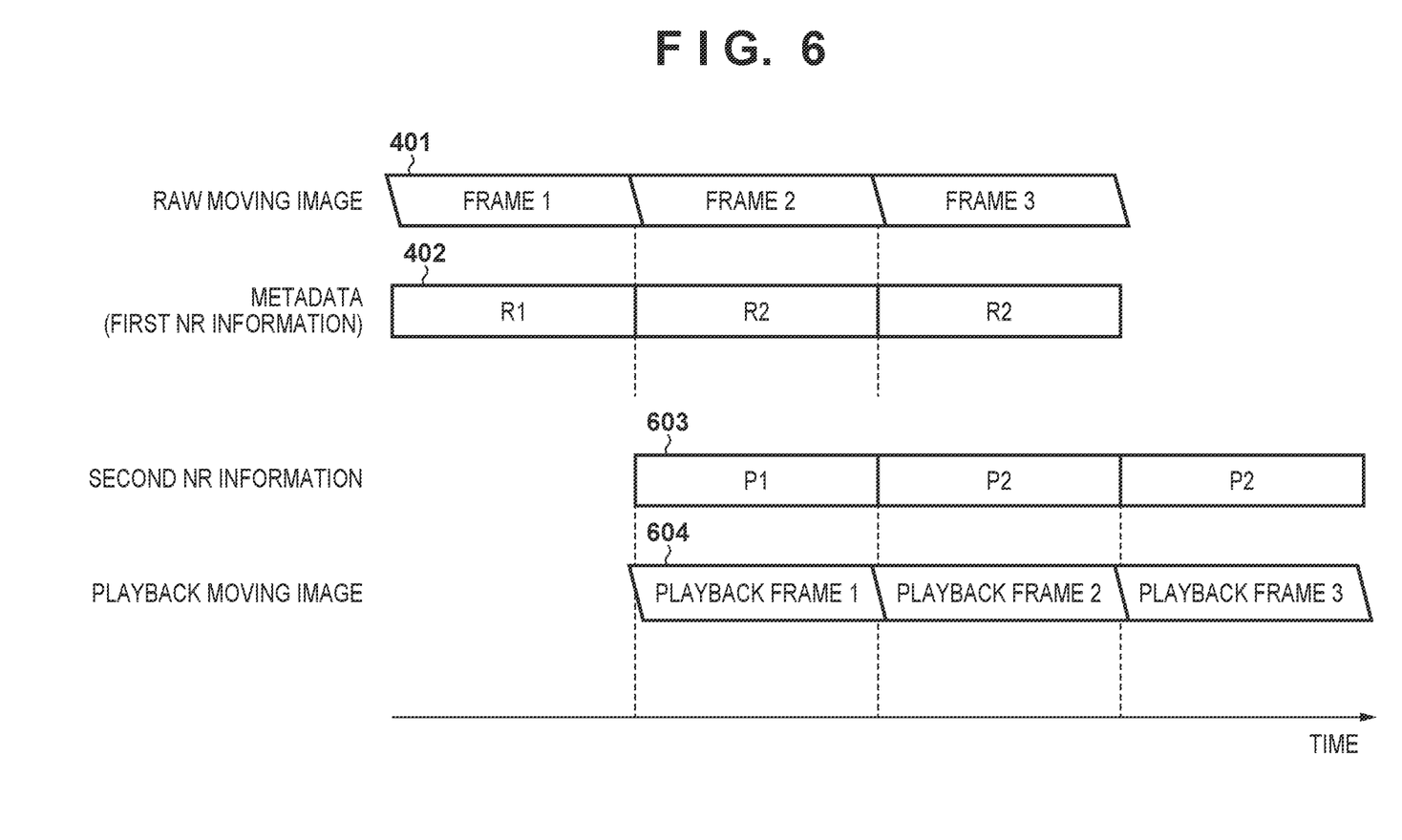
FIG. 6 is a diagram illustrating a relationship between a RAW moving image and metadata (first NR information), and second NR information and a playback moving image.

FIG. 6 is a diagram illustrating a relationship between a RAW moving image and metadata (the first NR information), and the second NR information and a playback moving image. Second NR information 603 is the second NR information generated in step S506, and as described earlier, P1 is a setting with a weak noise reduction effect for a reference region of 3×3 pixels, whereas P2 is a setting with a strong noise reduction effect for a reference region broader than that of P1, i.e., 5×5 pixels. As described earlier, the processing in the flowchart illustrated in FIG. 5 is executed for each frame, and thus the second NR information contains strength setting parameters for each of the frames. Playback moving image 604 contains playback frames that have been subjected to the noise reduction processing in accordance with the second NR information.

According to the first embodiment as described thus far, the image playback apparatus 200 obtains the first NR information, which defines noise reduction processing applied to a RAW moving image for the digital video camera 100 to generate the monitoring video. Then, on the basis of the first NR information, the image playback apparatus 200 generates the second NR information, which defines noise reduction processing using a noise reduction processing method different from that used by the digital video camera 100, and applies the noise reduction processing to the RAW moving image in accordance with the second NR information. As a result, noise reduction processing information, which defines noise reduction processing according to a specific noise reduction processing method, can be used when carrying out noise reduction processing according to a different noise reduction processing method.

The present embodiment describes a case where the digital video camera 100 and the image playback apparatus 200 each handle a mutually-different noise reduction processing method as an example. However, the technique of the present embodiment can also be applied in a case where the digital video camera 100 and the image playback apparatus 200 execute noise reduction processing using a plurality of the same noise reduction processing methods, but in different orders. For example, a case is conceivable in which the digital video camera 100 carries out noise reduction processing in the order of epsilon filter processing and median filter processing, whereas the image playback apparatus 200 carries out noise reduction processing in the order of median filter processing and epsilon filter processing. In such a case, if the epsilon filter processing and the median filter processing, and the order in which they are carried out, are taken as a single noise reduction processing method, the digital video camera 100 and the image playback apparatus 200 can be considered to be using different noise reduction processing methods. In this case, the first NR information includes the parameters for both the epsilon filter processing and the median filter processing. Then, on the basis of the first NR information, the image playback apparatus 200 may generate the second NR information, including the parameters for both the median filter processing and the epsilon filter processing, suited to a situation where the median filter processing and the epsilon filter processing are executed in that order.

Second Embodiment

While the first embodiment described a configuration in which the image playback apparatus 200 generates the first NR information and the second NR information, the second embodiment will describe a configuration in which the digital video camera 100 generates the second NR information from the first NR information. In the second embodiment, the basic configurations of the digital video camera 100 and the image playback apparatus 200 are the same as in the first embodiment (see FIGS. 1 and 2). The following will primarily describe points that are different from the first embodiment.

Figure 7:
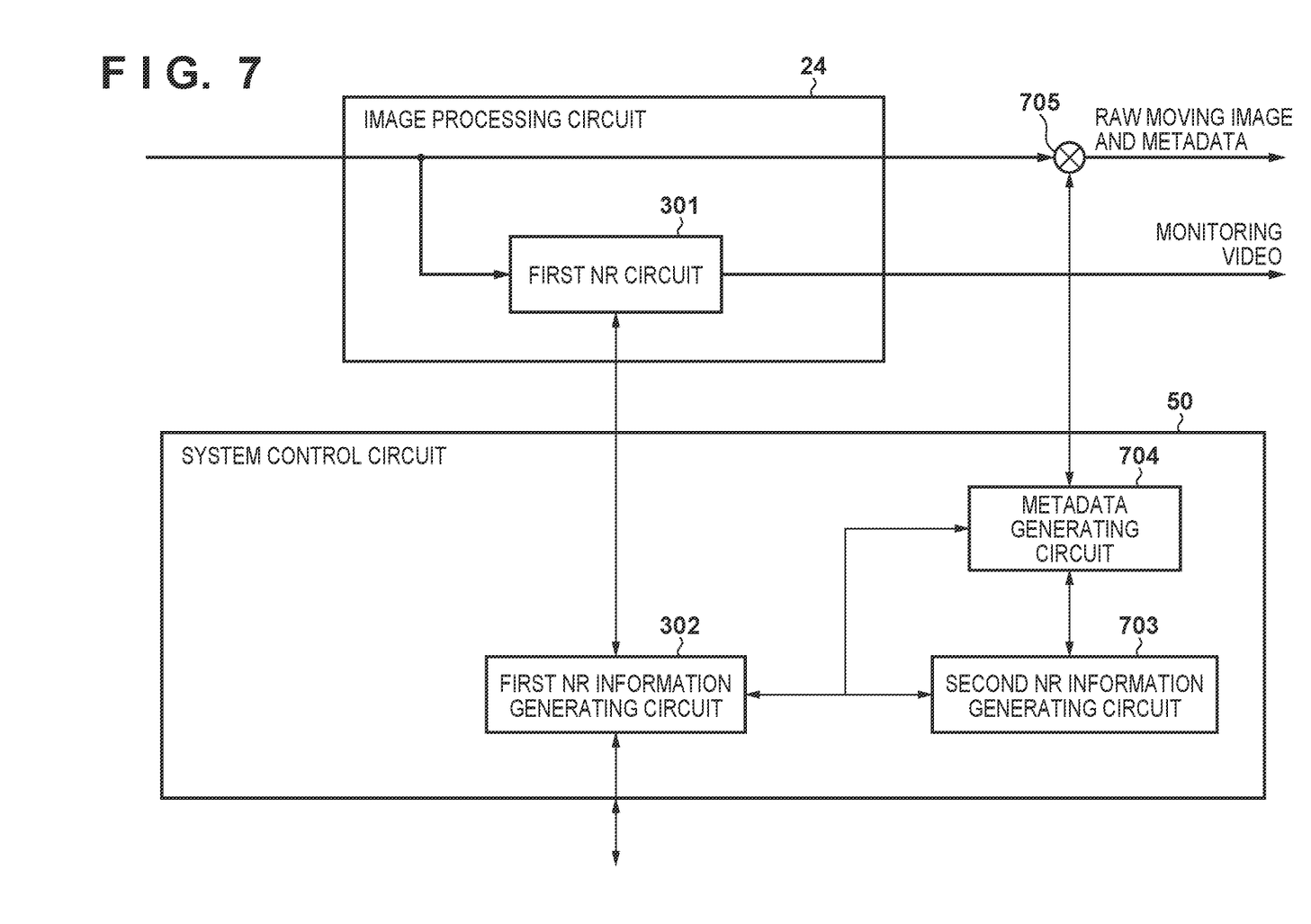
FIG. 7 is a diagram illustrating, in detail, the configuration of the image processing circuit 24 and the system control circuit 50, according to a second embodiment.

FIG. 7 is a diagram illustrating, in detail, the configurations of the image processing circuit 24 and the system control circuit 50, according to the second embodiment. A second NR information generating circuit 703 generates noise reduction processing information for epsilon filter processing, which is spatial filter-type noise reduction processing (the second NR information), on the basis of the first NR information generated by the first NR information generating circuit 302. The specific processing by which the second NR information generating circuit 703 generates the second NR information is the same as the process described in the first embodiment with reference to step S506 in FIG. 5. However, the second NR information generating circuit 703 may generate name and version information indicating the image playback apparatus (or playback application or the like) for which the second NR information is assumed to be used, information indicating the type of the noise reduction processing corresponding to the second NR information, and the like, and include that information in the second NR information.

A metadata generating circuit 704 generates metadata to be added to the RAW moving image. The metadata includes the first NR information, the second NR information, and various types of developing parameters. An adder 705 adds the metadata generated by the metadata generating circuit 704 to the RAW moving image input to the image processing circuit 24.

Note that like the first embodiment, the image to be played back by the image playback apparatus 200 is not limited to a RAW moving image. For example, the image to be played back may be a moving image that has already been developed. Furthermore, the image to be played back may be a RAW still image, or a still image that has already been developed. The technique of the present embodiment can be applied to any situation in which it is necessary to change the type, strength settings, and so on of noise reduction processing between when an image is shot and when the image is played back.

Furthermore, although the present embodiment describes a case where the second NR information is recorded in the metadata of the RAW moving image to be recorded as an example, the recording destination of the second NR information is not limited thereto, and a configuration may be employed in which the second NR information is added to an ancillary signal region of an SDI signal, for example.

Additionally, in the present embodiment, the digital video camera 100 is configured to be capable of developing/playing back the RAW moving image. The digital video camera 100 is also configured to be capable of using the image processing circuit 24 to carry out developing processing and noise reduction processing on the RAW moving image stored in the recording medium 90, and output the developed video.

Figure 9:
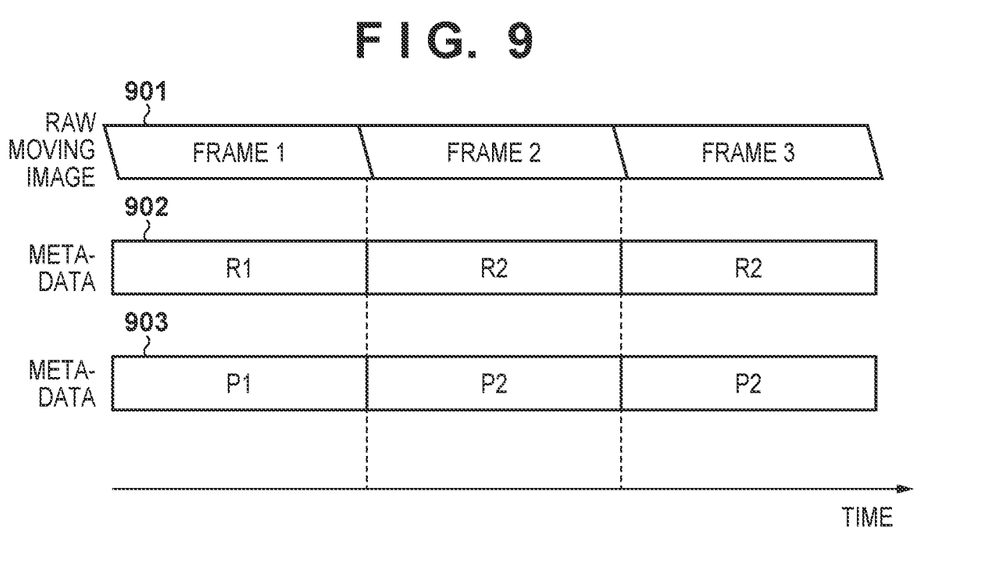
FIG. 9 is a conceptual diagram illustrating a RAW moving image to which metadata has been added, according to the second embodiment.

FIG. 9 is a conceptual diagram of a RAW moving image to which the metadata has been added. A RAW moving image 901 is constituted by three frames' worth of images (frames 1 to 3). Metadata 902 includes parameters for the noise reduction processing to be applied, on a frame-by-frame basis. The RAW moving image 901 and the metadata 902 are the same as the RAW moving image 401 and the metadata 402 described in the first embodiment with reference to FIG. 4. Metadata 903 includes the second NR information generated by the second NR information generating circuit 703. As illustrated in FIG. 9, the metadata 903 (second NR information) includes parameters for epsilon filter processing, for each of the frames. P1 and P2 indicated in FIG. 9 are the same as P1 and P2 described in the first embodiment with reference to FIG. 6. In the example illustrated in FIG. 9, an instruction to strengthen the noise reduction processing is made at the timing of frame 2, and the details of the recording parameters are changed. The instruction to strengthen the noise reduction processing is made by the user through the operation member 70 or the like.

Figure 8:
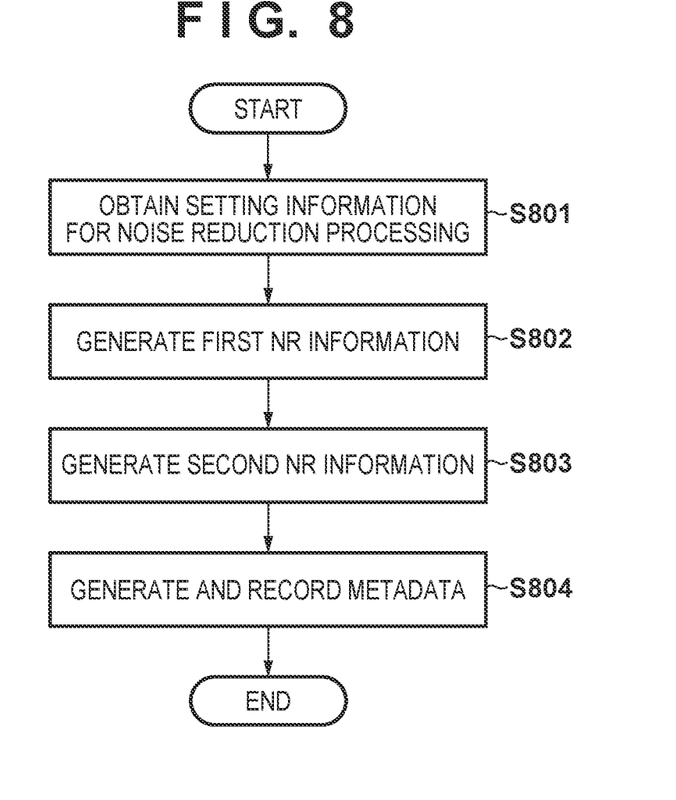
FIG. 8 is a flowchart illustrating an NR information recording process executed by the digital video camera 100.

Next, an NR information recording process executed by the digital video camera 100 will be described with reference to FIG. 8. When the digital video camera 100 is instructed to record a moving image, the digital video camera 100 executes the processing of this flowchart for each frame.

In step S801, the first NR information generating circuit 302 obtains setting information for the noise reduction processing to be applied to the monitoring video. The obtained setting information is menu setting values such as "weak", "strong", or the like in a noise reduction menu, selected in accordance with a user instruction.

In step S802, the first NR information generating circuit 302 generates the first NR information, which is setting values for a recursive filter to be applied to the monitoring video, in accordance with the menu setting values. The first NR information generating circuit 302 converts the menu setting values, from weak→R1, strong→R2, and so on. The first NR information generating circuit 302 outputs the first NR information to the second NR information generating circuit 703 and the metadata generating circuit 704.

In step S803, the second NR information generating circuit 703 generates the second NR information on the basis of the first NR information, through the same process as in step S506 of FIG. 5. The second NR information generating circuit 703 outputs the generated second NR information to the metadata generating circuit 704. Note that the second NR information generating circuit 703 may generate name and version information indicating the image playback apparatus (or playback application or the like) for which the second NR information is assumed to be used, information indicating the type of the noise reduction processing corresponding to the second NR information, and the like, and include that information in the second NR information. Additionally, if it is assumed that an image playback apparatus having a plurality of noise reduction processing functions will play the image back, information making it possible to determine the processing order may be included in the second NR information. Through this, the setting values for the noise reduction processing circuits on the playback side can be determined taking into account the types, processing orders, setting values, and the like of the noise reduction processing circuits, even in an apparatus aside from a specific image playback apparatus.

In step S804, the metadata generating circuit 704 generates metadata containing the first NR information and the second NR information, and outputs the metadata to the adder 705. As a result, the metadata is recorded in the recording medium 90 along with the RAW moving image.

Through the foregoing processing, noise reduction processing can be carried out in accordance with the second NR information when the image playback apparatus 200 plays back a RAW moving image. As a result, a noise reduction effect similar to the effect of the noise reduction processing which has been carried out by the digital video camera 100 on the monitoring video when shooting the RAW moving image is also achieved in the moving image played back by the image playback apparatus 200.

Note that like the first embodiment, it is not absolutely necessary for the effect of the noise reduction processing executed by the second NR circuit 205 according to the second NR information to become similar to the effect of the noise reduction processing executed by the first NR circuit 301 according to the first NR information. Regardless of the format, an effect in which the first NR information can be utilized in the execution of the noise reduction processing by the second NR circuit 205 is achieved as long as the second NR information is generated on the basis of the first NR information.

Additionally, the descriptions of the present embodiment assume that the first NR circuit 301 actually carries out the noise reduction processing in accordance with the first NR information. However, it is not absolutely necessary for the first NR circuit 301 to carry out the noise reduction processing in accordance with the first NR information. The effects of the present embodiment can be achieved as long as the digital video camera 100 is configured so that the second NR information, which defines noise reduction processing carried out through a specific noise reduction processing method applicable to an external apparatus such as the image playback apparatus 200, is generated on the basis of the first NR information.

Additionally, although the foregoing descriptions assume the metadata contains the first NR information and the second NR information, the first NR information need not be contained in the metadata. If the metadata contains the first NR information, the digital video camera 100 can carry out noise reduction processing in accordance with the first NR information when playing back a RAW moving image.

According to the second embodiment as described thus far, the digital video camera 100 generates the first NR information, which defines noise reduction processing applied to a RAW moving image for generating the monitoring video. Then, on the basis of the first NR information, the digital video camera 100 generates the second NR information, which defines noise reduction processing using a different noise reduction processing method from that used by the digital video camera 100, and records the second NR information and the RAW moving image in association with each other. As a result, noise reduction processing information, which defines noise reduction processing according to a specific noise reduction processing method, can be used when carrying out noise reduction processing according to a different noise reduction processing method.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-025787, filed Feb. 15, 2019 which is hereby incorporated by reference herein in its entirety.

What is claimed is:
1. An image processing apparatus comprising:
at least one memory configured to store instructions; and
at least one processor and/or at least one circuit in communication with the at least one memory and configured to execute the instructions to:

obtain an image and first NR information defining noise reduction processing using a first noise reduction processing method that an external apparatus can apply to the image;

generate, on the basis of the first NR information, second NR information defining noise reduction processing using a second noise reduction processing method that is different from the first noise reduction processing method; and apply the noise reduction processing using the second noise reduction processing method to the image in accordance with the second NR information, wherein the second NR information is generated such that an effect of the noise reduction processing using the second noise reduction processing method according to the second NR information becomes similar to an effect of the noise reduction processing using the first noise reduction processing method according to the first NR information.

2. The image processing apparatus according to claim 1, wherein the image is a moving image including a plurality of frames, wherein the first NR information defines the noise reduction processing using the first noise reduction processing method for each of the plurality of frames, and wherein the second NR information is generated so as to define the noise reduction processing using the second noise reduction processing method for each of the plurality of frames.

3. The image processing apparatus according to claim 2, wherein the first noise reduction processing method includes one of a recursive noise reduction processing method and a spatial filter-type noise reduction processing method, and wherein the second noise reduction processing method includes the other of the recursive noise reduction processing method and the spatial filter-type noise reduction processing method.

4. The image processing apparatus according to claim 1, wherein the second noise reduction processing method carries out a same plurality of types of noise reduction processing as the first noise reduction processing method, and wherein an order in which the plurality of types of noise reduction processing are carried out is different for the first noise reduction processing method and the second noise reduction processing method.

5. The image processing apparatus according to claim 1, wherein the at least one processor further executes the instructions to obtain metadata that contains the first NR information and that is associated with the image.

6. An image processing method executed by an image processing apparatus, the method comprising:

obtaining an image and first NR information defining noise reduction processing using a first noise reduction processing method that an external apparatus can apply to the image;

generating, on the basis of the first NR information, second NR information defining noise reduction processing using a second noise reduction processing method which is different from the first noise reduction processing method; and applying the noise reduction processing using the second noise reduction processing method to the image in accordance with the second NR information, wherein the second NR information is generated such that an effect of the noise reduction processing using the second noise reduction processing method according to the second NR information becomes similar to an effect of the noise reduction processing using the first noise reduction processing method according to the first NR information.

7. A non-transitory computer-readable storage medium which stores a program for causing a computer to execute an image processing method comprising:

obtaining an image, and first NR information defining noise reduction processing using a first noise reduction processing method which an external apparatus can apply to the image;

generating, on the basis of the first NR information, second NR information defining noise reduction processing using a second noise reduction processing method which is different from the first noise reduction processing method; and applying the noise reduction processing using the second noise reduction processing method to the image in accordance with the second NR information, wherein the second NR information is generated such that an effect of the noise reduction processing using the second noise reduction processing method according to the second NR information becomes similar to an effect of the noise reduction processing using the first noise reduction processing method according to the first NR information.

* * * * *